July 22, 1969      P. A. MONGERSON      3,456,677
SELF-LUBRICATING CARTRIDGE FOR USE IN WATER FAUCETS OR THE LIKE
Filed Oct. 26, 1966
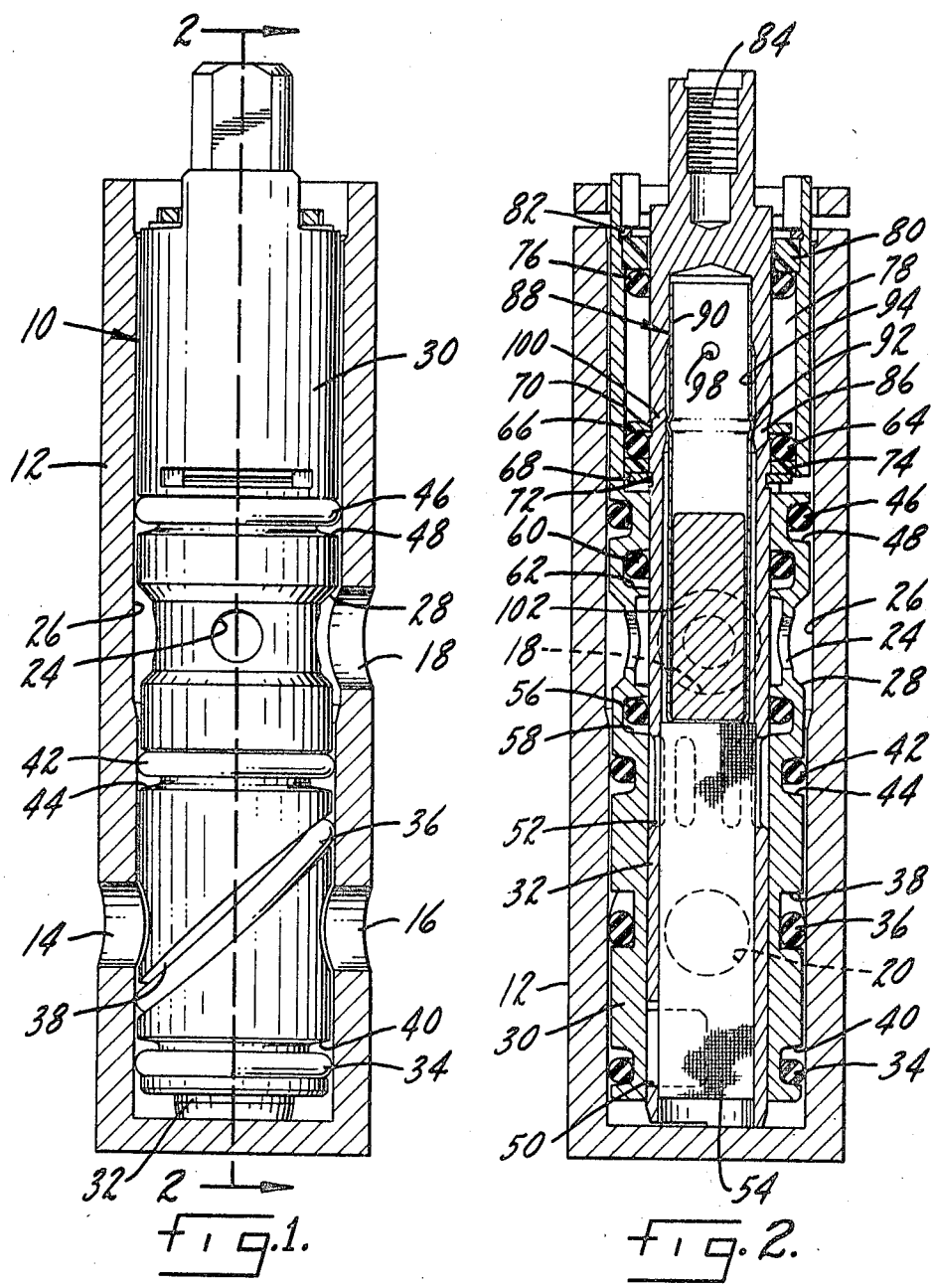
INVENTOR.
Paul A. Mongerson,
BY Parker & Carter
Attorneys.

United States Patent Office 3,456,677
Patented July 22, 1969

3,456,677
SELF-LUBRICATING CARTRIDGE FOR USE IN WATER FAUCETS OR THE LIKE
Paul A. Mongerson, Elyria, Ohio, assignor to Standard Screw Company, Bellwood, Ill., a corporation of New Jersey
Filed Oct. 26, 1966, Ser. No. 589,670
Int. Cl. F16k 19/00, 3/36, 5/22
U.S. Cl. 137—246.11                                    4 Claims

ABSTRACT OF THE DISCLOSURE

A water faucet valve assembly including a sleeve and a stem movable within the sleeve and seal members between the stem and sleeve. The valve assembly includes a self-contained source of lubricant, preferably a part of the stem, with pressure applied by the water flowing through the valve assembly and by relative movement between the stem and sleeve forcing lubricant out of the self-contained source toward at least one of the seal rings between the stem and sleeve.

---

This invention relates to a self-lubricating water faucet valve and particularly to a mixing valve having a source of lubricant therein, which lubricant is dispensed by water pressures within the valve.

A primary purpose of the invention is a mixing valve cartridge of the type described having a self-contained source of lubricant, which lubricant is dispensed in accordance with pressure differentials created within the valve.

Another purpose is a water faucet mixing valve cartridge including a cylinder filled with lubricant, a movable member positioned at one end of said cylinder and subject to water pressure within the valve, with the pressure applied to said movable member being effective to dispense lubricant from said source to the seal rings used in the valve cartridge.

Another purpose is a mixing valve for use in a water faucet, said valve including a self-contained source of lubricant, which can be dispensed by differential pressures acting upon the source of lubricant during opening and closing of the valve.

Another purpose is a fluid control valve having relatively movable members, seal rings between the members, and a self-contained source of lubricant within the valve, with the lubricant being moved to at least one of the seal rings by fluid pressure differentials from within the valve.

Other purposes will appear in the ensuing specification, drawings and claims.

The invention is illustrated diagrammatically in the following drawings wherein:

FIGURE 1 is a side elevation of a water faucet mixing valve of the type described, with the valve housing in section, and FIGURE 2 is an axial section, as viewed along line 2—2, through the mixing valve illustrated in FIGURE 1.

The invention will be described in connection with a mixing valve cartridge of the type illustrated in U.S. Patent Re. 25,920. It should be understood, however, that the basic principle disclosed herein has wider application and should not be limited to any particular valve nor to a valve cartridge.

The principle disclosed herein may be applied to any valve, although it is described herein in connection with a water faucet of the type conventionally used in the home to provide mixed amounts of hot and cold water at a desired volume. Such faucets find use in kitchens, bathroom basins, shower installations, bathtubs, and in shower and tub combinations. The basic concept of the invention is to provide, in a valve, a self-contained source of lubricant for the seal members of the valve, which seal members periodically need re-lubrication. The self-contained source of lubricant, which may be in a cartridge form, is arranged to dispense lubricant to the areas of the seal rings requiring lubricant, generally in response to pressure differentials from within the valve, usually when the valve is opened and closed.

Turning to FIGURE 1, a cartridge of the type generally disclosed in the above-mentioned U.S. patent, is indicated at 10. There is a housing 12 about the cartridge with the housing having hot and cold water inlets 14 and 16, as conventional. The housing 12 may have a discharge port 18, which is conventionally connected to a water spout or the like.

The valve cartridge 10 may have hot and cold water inlet ports, one of which is indicated at 20, which are positioned in alignment with the hot and cold water inlet ports 14 and 16 in the housing 12. There is a plurality of discharge ports 24 in the exterior of the cartridge 10, which ports are in communication with the discharge port 18 in the faucet housing. It should be noted that the housing 12 has a portion 26 of increased diameter, which is in alignment with a groove 28 in the exterior surface of the cartridge 10 at the position of the ports 24. In this way, there is circumferential access from the ports 24 to the discharge port 18 in the housing 12.

The cartridge 10 may include an outer sleeve 30 and an inner movable stem or valve member 32. The stem 32 may both reciprocate and rotate within the sleeve 30 to control the volume and temperature of water discharge from the ports 24. The exterior of the sleeve 30 may have a lower or first O-ring 34, which is generally at the bottom of the cartridge when it is inserted within a housing. Next, there is a diagonal seal ring or O-ring 36 which separates the hot and cold water inlet ports so that there is no cross flow between these ports. The diagonal O-ring 36 is positioned within a diagonal groove 38 and O-ring 34 will be positioned in a generally circular groove 40. There may be another seal ring or O-ring 42, positioned in a groove 44, which is above the diagonal O-ring 36 and is effective to prevent water from the inlet ports from reaching the discharge ports. The exterior surface of the sleeve may be completed by an additional O-ring 46, in a groove 48, which O-ring is effective to prevent water coming out of the discharge ports from reaching the exterior of the valve by passing along the portions between the exterior of the sleeve and the interior of the housing.

The stem 32 may have an arcuately shaped inlet port 50, which is so sized and arranged that it may be placed in communication with both the hot and cold water inlet ports in the sleeve member, or with only one of said ports. The stem 32 is hollow such that water flowing in the arcuate opening 50 will move upward toward a plurality of discharge slots 52 formed in the stem and which may be placed in communication with the discharge ports 24 by moving the stem upwardly. As shown in the drawings, the valve is closed. When the stem is moved upwardly, the valve is opened. When the stem is rotated, the temperature of the water discharged from the valve is controlled. There may be a screen 54 positioned within the stem and extending from the inlet 50 to the discharge slots 52, with the screen 54 functioning to break up the water moving from the inlet to the outlet. Turbulence created by the screen reduces the hum or singing noise which may at times be prevalent when there is a solid stream of water moving from the inlet to the outlet.

There may be a plurality of seal rings positioned between the exterior of the stem and the interior of the sleeve. An O-ring 56, in a groove 58, may seal the lower side of the discharge ports 24 with a similar O-ring 60, in a groove 62, sealing the opposite or upper side of the discharge ports 24. The next O-ring in the series between the stem and the sleeve is in O-ring 64, which is positioned between a pair of snap rings 66 and 68, which are held in position by means of grooves 70 and 72, respectively, formed in the exterior surface of the stem. There may be a plastic or rubber substitute ring 74 positioned between snap ring 68 and the seal 64 for use in positioning the seal 64 and preventing its movement as the stem is reciprocated.

It should be explained that the valve illustrated herein is pressure balanced, as the cross sectional area of the entire stem is equal to the cross sectional area of O-ring 64. Water pressure is applied to the stem in such a manner as to tend to bias it or move it upward. Water pressure is applied to O-ring 64, which force is applied through ring 74 and ring 68 to the stem, tending to move it downward. Inasmuch as the water pressures applied to these two areas are equal, and the areas are equal, the valve is pressure balanced in both its open and closed positions.

A chamber 78 may be formed by O-ring 64 and by a second O-ring 76 at the upper end of the stem. The chamber 78 will receive water through one or more openings 86 which communicate with the chamber and with the interior of the stem. Adjacent O-ring 76 is a brake member 80, which is held in position by a small retaining ring or the like 82. The stem may be completed by an opening 84, preferably threaded, for receiving a screw or the like which attaches an operating handle to the stem.

Positioned within the hollow interior of the stem 32 is a lubricant cartridge indicated generally at 88. As shown herein, the cartridge is positioned at the upper end of the hollow stem. The lubricant cartridge may have an exterior shell 90 with a circumferential bead 92. The bead 92 is positioned within an enlarged area 94 in the interior surface of the stem.

The lubricant cartridge may include one or more openings 98 which communicate with the exterior of the lubricant cartridge and with one or more passages 100, which connect the lubricant cartridge with the exterior of the stem adjacent O-ring 64. Bead 92 is effective to prevent lubricant from flowing completely along the surface of the cartridge. It is O-ring 64 which requires lubricant in order to prevent the valve from sticking and to insure continuous easy and free operation of the stem. Accordingly, passages 100 are positioned to provide lubricant principally to this O-ring. However, reciprocation of the stem, in opening and closing the valve, is effective to move lubricant to the areas of O-rings 76 and 60 for lubrication of these elements.

Also positioned within the lubricant cartridge is a piston or plug 102, which is open to water pressure at its lower end. It should be noted that the cross sectional area of piston 102 which is open to water pressure, is substantially larger than the cross sectional area of openings 98. The normal water pressures on piston 102, when the stem is stationary are not sufficient to overcome the inertia of a viscous lubricant. However, the additional pressure applied to piston 102, during opening and closing of the valve creates sufficient pressure differentials on the lubricant to force it out of openings 98 toward the seal rings where the lubricant is needed. In effect, every time the stem is moved, there will be lubricant supplied to the valve seal rings.

The invention should not be limited to a piston or to a plug for dispensing lubricant out of the lubricant cartridge. There may be a ball or some other member which is so positioned that one side is at water pressure and the other side can apply the water pressure created force to the lubricant within the cartridge. There are many other arrangements which may also be satisfactory. For example, the entire cartridge may be closed, but arranged much as a squeeze bottle in that water pressure can be applied to the sides of the cartridge in such a way as to dispense lubricant from small openings positioned about the periphery of the lubricant cartridge. The invention should not be limited to any particular configuration of lubricant cartridge nor to any particular dispensing means. The invention is generally directed to a water pressure differential dispensing means for lubricant within a valve having relatively movable control members.

Whereas the preferred form of the invention has been shown and described herein, it should be realized that there are many modifications, substitutions and alterations thereto within the scope of the following claims.

I claim:

1. For use in a water faucet assembly, a valve for controlling the flow of water through said faucet assembly, said valve including an outer sleeve and an inner stem, said stem and sleeve being movable relative to each other, seal members positioned between the sleeve and stem, a source of lubricant in said valve including a container having lubricant therein, an opening in said container from which lubricant may be moved to at least one of said seal members, means, responsive to water pressure from within the sleeve for moving lubricant through said opening including a movable member, at least partly within said container, one side of said movable member being under pressure, from water within the sleeve, the cross sectional area of said opening being smaller than the cross sectional area of said member exposed to water pressure, relative movement between said sleeve and stem increasing the pressure applied by water within the sleeve to said one side of the movable member to thereby move lubricant through said opening toward a seal member.

2. The structure of claim 1 further characterized in that said source of lubricant is within said stem.

3. The structure of claim 1 further characterized in that said movable member is a piston positioned within said lubricant container.

4. The structure of claim 1 further characterized by a plurality of openings connecting the interior of said container and at least one of said seal members, said container being closed except for said plurality of openings and a passage for movement of said movable member.

References Cited

UNITED STATES PATENTS

| Re. 25,920 | 11/1965 | Moen | 137—636.4 X |
| 2,300,835 | 11/1942 | Volpin | 137—246.12 |
| 2,918,935 | 12/1959 | Ohls | 137—246.12 X |
| 2,982,296 | 5/1961 | Ohls | 137—246.12 |

CLARENCE R. GORDON, Primary Examiner

U.S. Cl. X.R.

137—246.12, 264.13, 636.4